(12) United States Patent
Ogawa et al.

(10) Patent No.: US 11,255,247 B2
(45) Date of Patent: Feb. 22, 2022

(54) SENSOR

(71) Applicant: NGK SPARK PLUG CO., LTD., Nagoya (JP)

(72) Inventors: Kouji Ogawa, Nagoya (JP); Ayaka Ota, Nagoya (JP); Hideya Inukai, Nagoya (JP); Yasuhiro Ishiguro, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 213 days.

(21) Appl. No.: 16/749,598

(22) Filed: Jan. 22, 2020

(65) Prior Publication Data

US 2020/0271040 A1 Aug. 27, 2020

(30) Foreign Application Priority Data

Feb. 22, 2019 (JP) .............................. JP2019-030512

(51) Int. Cl.
*F01N 11/00* (2006.01)
*F01N 13/00* (2010.01)

(52) U.S. Cl.
CPC .......... *F01N 11/007* (2013.01); *F01N 13/008* (2013.01); *F01N 2260/20* (2013.01); *F01N 2510/02* (2013.01); *F01N 2510/08* (2013.01); *F01N 2530/02* (2013.01)

(58) Field of Classification Search
CPC combination set(s) only.
See application file for complete search history.

(56) References Cited

U.S. PATENT DOCUMENTS

| 6,202,469 B1* | 3/2001 | Nakamura | G01N 27/4077 73/114.73 |
|---|---|---|---|
| 6,726,819 B2* | 4/2004 | Atsumi | G01N 27/4077 204/424 |
| 7,066,009 B2* | 6/2006 | Yamada | G01N 1/2252 73/23.31 |
| 2003/0136675 A1* | 7/2003 | Ishikawa | G01N 27/4077 204/424 |
| 2010/0170794 A1* | 7/2010 | Gibson | G01N 27/407 204/406 |
| 2014/0305188 A1* | 10/2014 | Kume | G01N 33/0009 73/23.2 |
| 2016/0274053 A1* | 9/2016 | Fujii | G01N 27/4073 |

FOREIGN PATENT DOCUMENTS

JP 2008-003076 A 1/2008

* cited by examiner

*Primary Examiner* — Binh Q Tran
(74) *Attorney, Agent, or Firm* — Sughrue Mion, PLLC (57) ABSTRACT

A sensor including a sensor element, a metallic shell, a terminal fitting, a cylindrical case, lead wires, a connector portion, and a cylindrical heat shield tube. The heat shield tube includes a first tube and a second tube. The second tube is disposed on a distal end side of the first tube and covers an outer surface of the rear end side of the case, while providing an overlapping portion that overlaps the first tube. A rear end side of the first tube is adjacent to the connector portion. A total length T of the heat shield tube and a length S of the overlapping portion satisfy T/10≤S≤T/5. Further, a length L1 of the first tube and a length L2 of the second tube satisfy T/2≤L2<L1.

4 Claims, 5 Drawing Sheets

PRIOR ART

FIG. 5

PRIOR ART

SENSOR

BACKGROUND OF THE INVENTION

1. Field of the Invention

The present invention relates to a gas sensor.

2. Description of the Related Art

A sensor that detects a concentration of a measured gas is commonly attached to an exhaust pipe of an automobile or the like.

Figure 4:
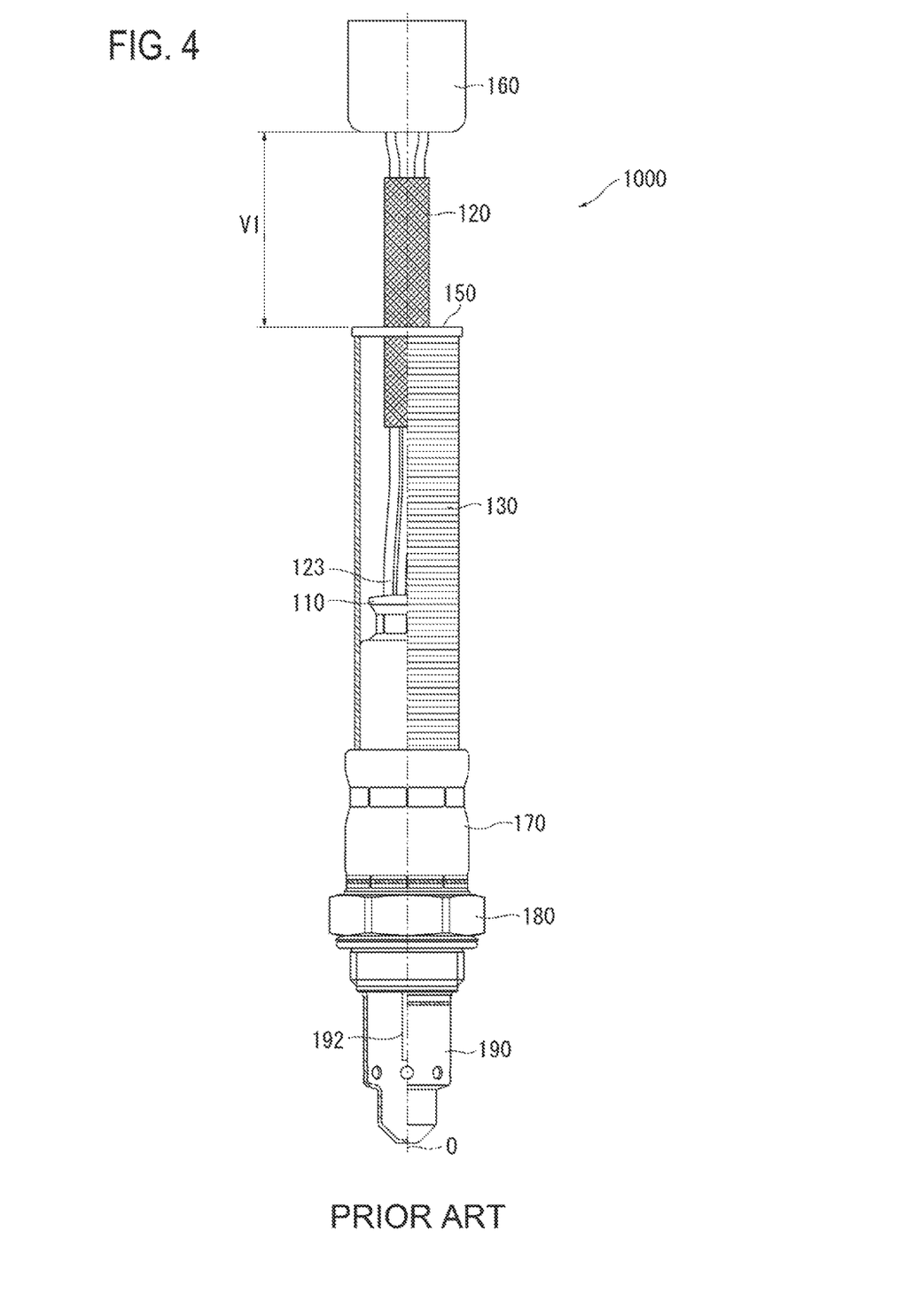
FIG. 4 is a half-sectional view taken along an axial direction of a related art sensor.

In such a sensor 1000 as shown in FIG. 4, a sensor element 192 is held by a metallic shell 180, a distal end side of the sensor element 192 is covered with a protector 190, and a rear end side of the sensor element 192 is covered with a cylindrical case 170. A rear end side of the case 170 together with a rubber seal member 110 is crimped to seal inside and outside, and lead wires 123 are inserted through the seal member 110 and are drawn outside the sensor.

However, since the seal member 110 generally has a low heat resistance, when the sensor 1000 is used in a high temperature environment for a long period of time, the seal member 110 may be damaged by radiant heat and the integrity of the seal of the sensor 1000 may be impaired. In addition, upon heating the lead wires 123 to the extent that the insulation coating thereof melts, the insulating property is impaired.

Therefore, a technique has been developed in which the seal member 110 and the lead wires 123 are surrounded by a heat shield tube 130, and the lead wires 123 are fixed to the heat shield tube 130 with a fastener 150 on a rear end side of the heat shield tube 130 (JP-A-2008-003076).

The lead wires 123 are collectively covered with a protection tube 120. A connector 160 protruding radially outward of the lead wires 123 is connected to a rear end side of the lead wires 123, and the connector 160 can be connected to an external device (such as an ECU of a vehicle).

Figure 5:
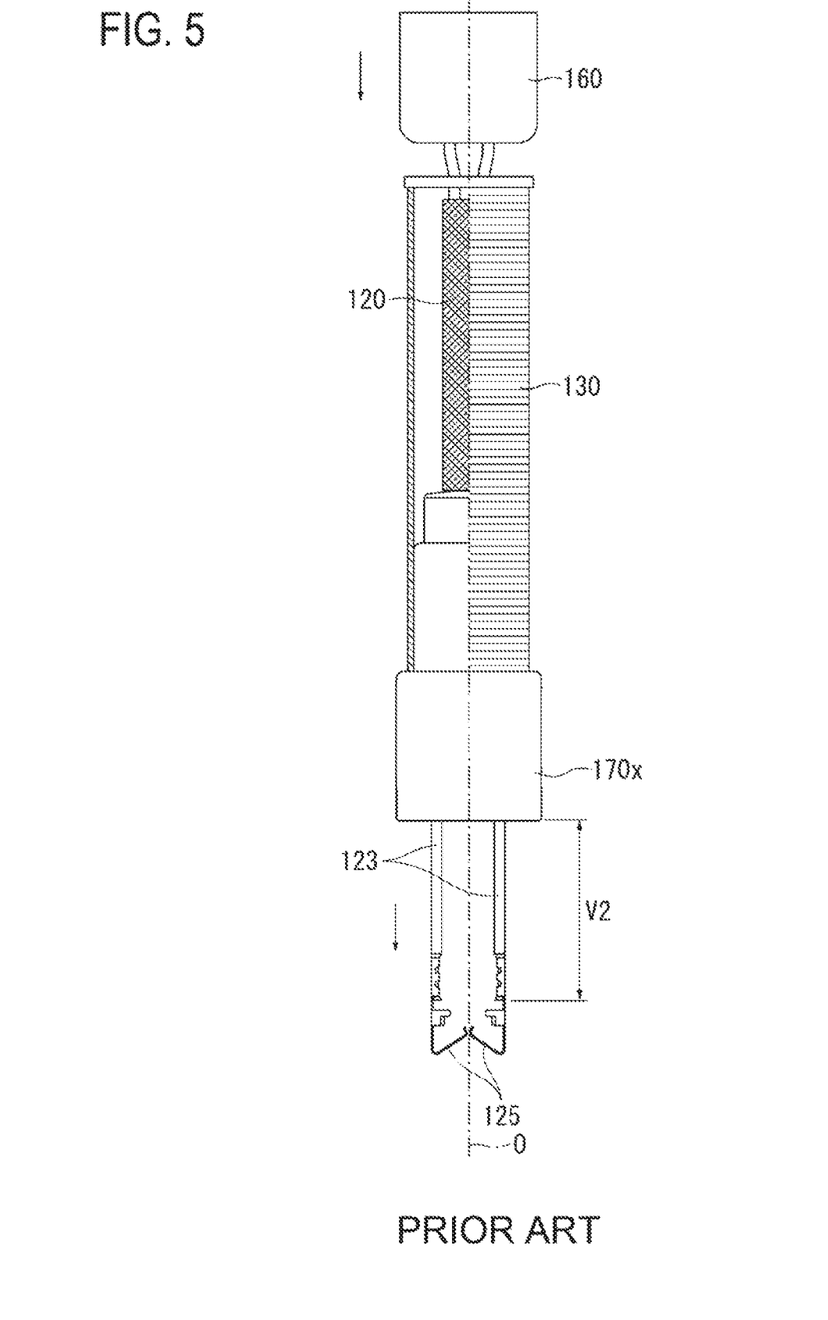
FIG. 5 is a view showing a step of crimp-connecting a terminal fitting to lead wires according to a related art sensor.

In the sensor 1000, a region V1 on the rear end side of the lead wires 123 (the protection tube 120 covering the lead wires 123) is exposed at a rear end of the heat shield tube 130. This is because, as shown in FIG. 5, the connector 160 is connected to the rear end side of the lead wires 123 in advance, while a connection terminal 125 is subsequently crimp-connected to a distal end side of the lead wires 123.

That is, during crimp-connecting, the lead wires 123 are advanced to a distal end side through a case 170x that is not crimped, and a space V2 for gripping the lead wires 123 must be provided between distal ends of the lead wires 123 and the case 170. However, considering that the connector 160 having a large diameter comes into contact with and interferes with the rear end of the heat shield tube 130, a length of the region V1 needs to be longer than a space V2.

Since the case 170x is not crimped, the seal member 110 is not crimped, and the lead wires 123 can be advanced through the seal member 110.

However, in recent years, there has been a need to dispose a sensor close to an engine of a vehicle or an exhaust system of the vehicle, and almost the entirety of the lead wires (the protection tube) needs to be covered with a heat shield tube in order to further improve the heat resistance of the sensor. Since the heat shield tube has structurally poor elasticity and cannot be pulled in, when almost the entirety of the lead wires is covered with the heat shield tube, the lead wires 123 cannot be advanced and a sufficient region V2 cannot be secured. Therefore, it is difficult to subsequently crimp-correct the connection terminal 125 to the rear side to the distal end side of the lead wires 123.

SUMMARY OF THE INVENTION

It is therefore an object of the present invention to provide a sensor that has improved heat resistance by reliably surrounding lead wires extending outside of a sensor with a heat shield tube and which does not hinder connection of a terminal fitting to the lead wires.

The above objection is achieved by providing, in a first aspect of the invention, (1) a sensor including:

a sensor element;

a metallic shell that accommodates the sensor element;

a terminal fitting that is disposed on a rear end side of the sensor element and electrically connected to the sensor element;

a cylindrical case that extends in an axial direction and is disposed and connected on a rear end side of the metallic shell;

one or more lead wires that are electrically connected to a rear end side of the terminal fitting and extend from inside to outside of the case;

a connector portion that is connected to a rear end side of the lead wires and protrudes radially outward of the lead wires; and a cylindrical heat shield tube that covers an outer surface of a rear end side of the case, extends rearward of the case and surrounds the lead wires, wherein the heat shield tube includes a first tube and a second tube that has an inner diameter larger than an outer diameter of the first tube and is capable of accommodating the first tube, the second tube is disposed on a distal end side of the first tube and covers an outer surface of the rear end side of the case, while providing an overlapping portion that overlaps the first tube, a rear end side of the first tube is adjacent to the connector portion, a total length T of the heat shield tube and a length S of the overlapping portion satisfy $T/10 \leq S \leq T/5$, and a length L1 of the first tube and a length L2 of the second tube satisfy $T/2 \leq L2 < L1$.

According to the sensor (1), since the first tube and the second tube constituting the heat shield tube are provided with the overlapping portion and extend from the rear end side of the case to a portion adjacent to the connector portion, almost the entirety of the lead wires can be covered with the heat shield tube. Further, the lead wires can be reliably surrounded by the heat shield tube to improve the heat resistance.

Since the first tube can be accommodated inside the second tube, a length of the heat shield tube during accommodation is shortened to the length of the first tube. This produces a difference between the shortened length and the total length T of the heat shield tube during extension. Since the lead wires together with the heat shield tube can be advanced distally through the case on account of this difference, a space for gripping the lead wires can be ensured between the distal ends of the lead wires and the case. Consequently, connection of the terminal fitting to the lead wires is not hindered.

In a preferred embodiment (2) of the sensor (1 the first tube and the second tube are formed by coating an outer surface of a glass fiber braided body with aluminum.

In a second aspect, the invention provides (3) a sensor including:
- a sensor element;
- a metallic shell that accommodates the sensor element;
- a terminal fitting that is disposed on a rear end side of the sensor element and electrically connected to the sensor element;
- a cylindrical case that extends in an axial direction and is disposed and connected on a rear end side of the metallic shell;
- one or more lead wires that are electrically connected to a rear end side of the terminal fitting and extend from inside to outside of the case;
- a connector portion that is connected to a rear end side of the lead wires and protrudes radially outward of the lead wires; and
- a cylindrical heat shield tube that covers an outer surface of a rear end side of the case, extends rearward of the case and surrounds the lead wires, wherein
- the heat shield tube includes a first tube, a second tube that has an inner diameter larger than an outer diameter of the first tube and is capable of accommodating the first tube, and a third tube that has an inner diameter larger than an outer diameter of second tube and is capable of accommodating the second tube,
- the third tube is disposed on a distal end side of the second tube and covers an outer surface of the rear end side of the case, while providing a first overlapping portion that overlaps the second tube,
- the second tube is disposed on a distal end side of the first tube while providing a second overlapping portion that overlaps the first tube,
- a rear end side of the first tube is adjacent to the connector portion,
- a total length T of the heat shield tube, a length S1 of the first overlapping portion and a length S2 of the second overlapping portion satisfy $T/10 \leq S1 \leq T/5$ and $T/10 \leq S2 \leq T/5$, and
- a length L1 of the first tube, a length L2 of the second tube and a length L3 of the third tube satisfy $T/3 \leq L3 < L2 < L1$.

According to the sensor (3), since the first tube to the third tube constituting the heat shield tube are provided with the first overlapping portion and the second overlapping portion and extend from the rear end side of the case to a portion adjacent to the connector portion, almost the entirety of the lead wires can be covered with the heat shield tube. Further, the lead wires can be reliably surrounded by the heat shield tube to improve the heat resistance.

Since the first tube can be accommodated inside the second tube and the second tube can be accommodated inside the third tube, a length of the heat shield tube during accommodation is shortened to the length of the first tube. This produces a difference between the shortened length and the total length T of the heat shield tube during extension. Since the lead wires together with the heat shield tube can be advanced distally through the case on account of this difference, a space for gripping the lead wires can be ensured between distal ends of the lead wires and the case, and connection of the terminal fitting to the lead wires is not hindered.

In a preferred embodiment (4) of the sensor (3), the first tube to the third tube are formed by coating an outer surface of a glass fiber braided body with aluminum.

According to the present invention, a sensor having improved heat resistance can be obtained by reliably surrounding lead wires extending outside of a sensor with a heat shield tube and that does not hinder connection of a terminal fitting to the lead wires.

Reference symbols used to identify various features in the drawings include the following.

100 sensor; 11 seal member; 12 lead wire; 15 sensor element; 17 case; 17e rear end side of case; 18 metallic shell; 20 connector portion; 25 terminal fitting; 30 heat shield tube; 31 first tube; 32 second tube; 33 overlapping portion; O axis.

DETAILED DESCRIPTION OF THE PREFERRED EMBODIMENTS

The present invention will now be described in greater detail below with reference to the drawings. However, the present invention should not be construed as being limited thereto.

Figure 1:
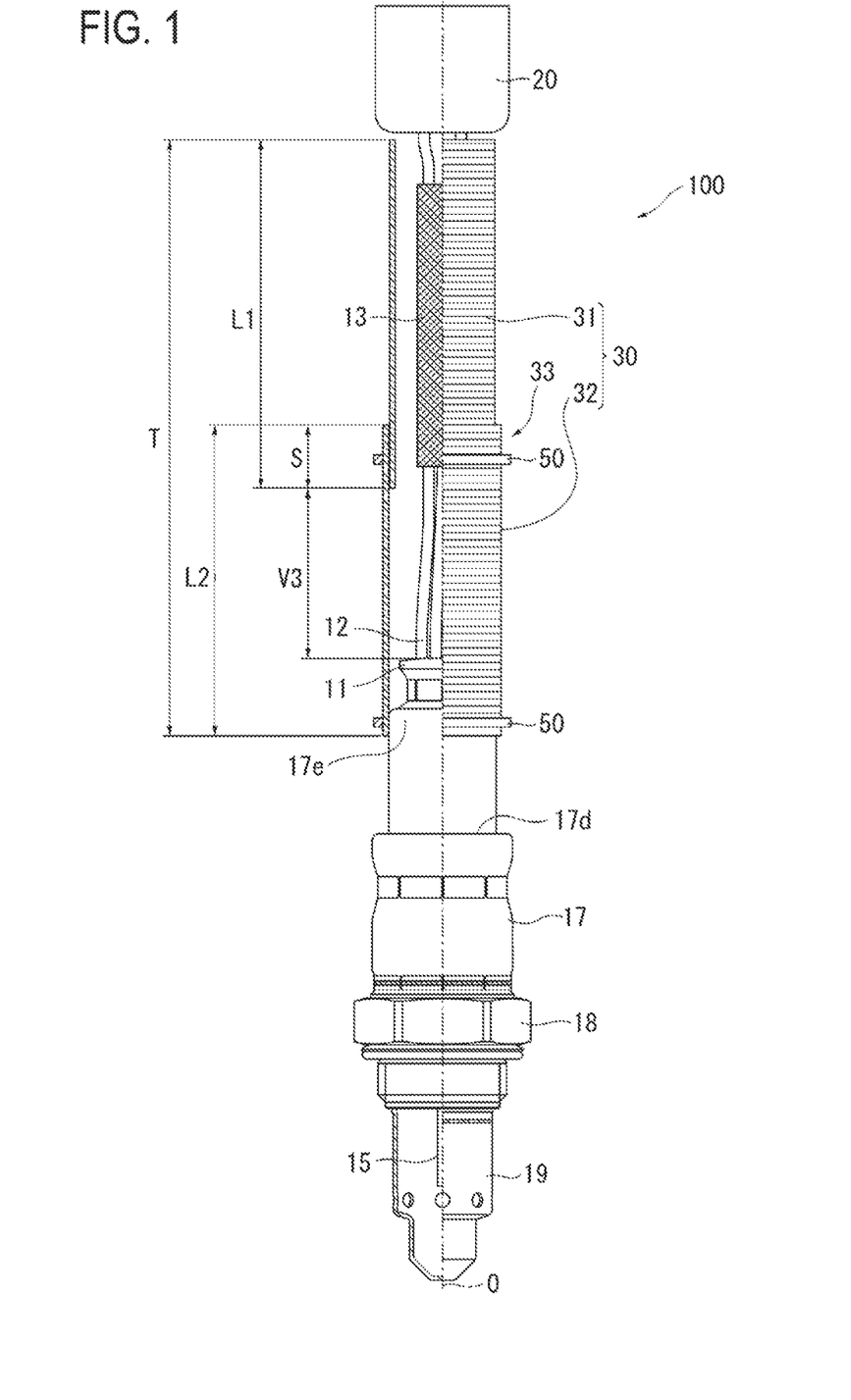
FIG. 1 is a half-sectional view taken along an axial direction of a sensor according to an embodiment of the present invention.
Figure 2:
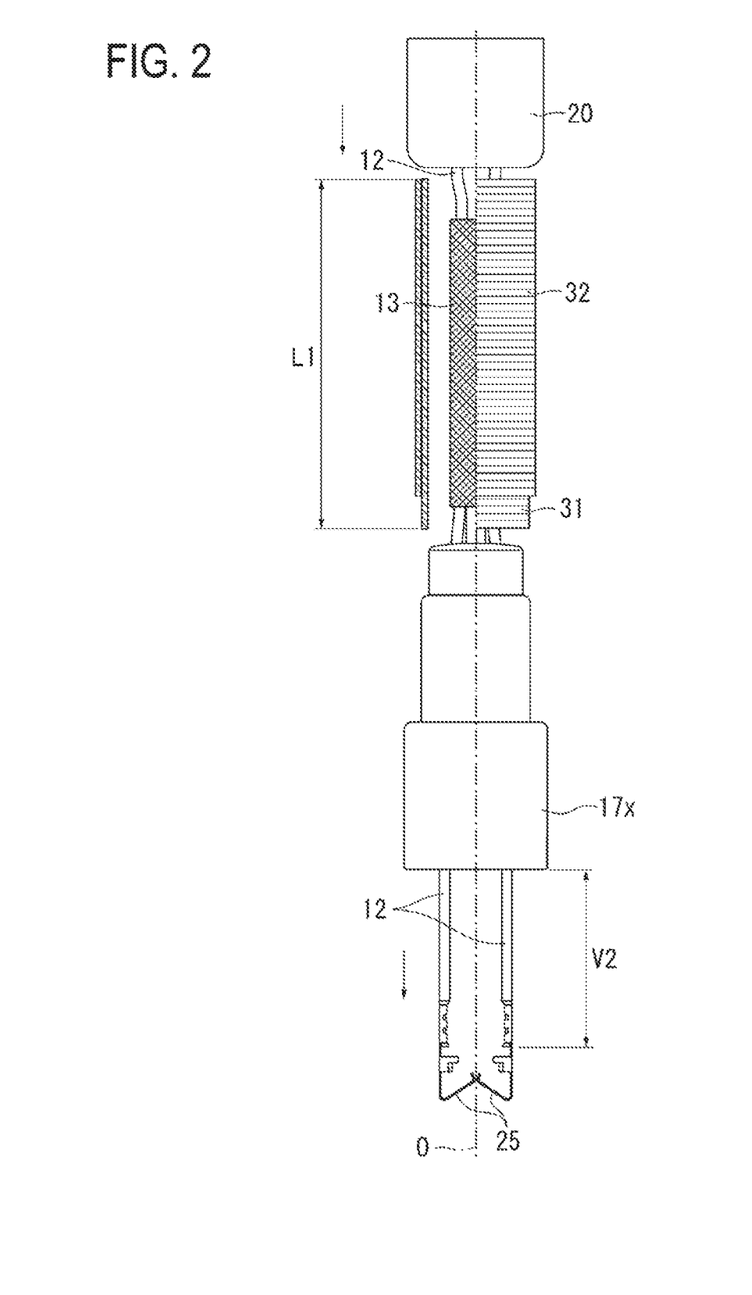
FIG. 2 is a view showing a step of crimp-connecting a terminal fitting to lead wires.
Figure 3:
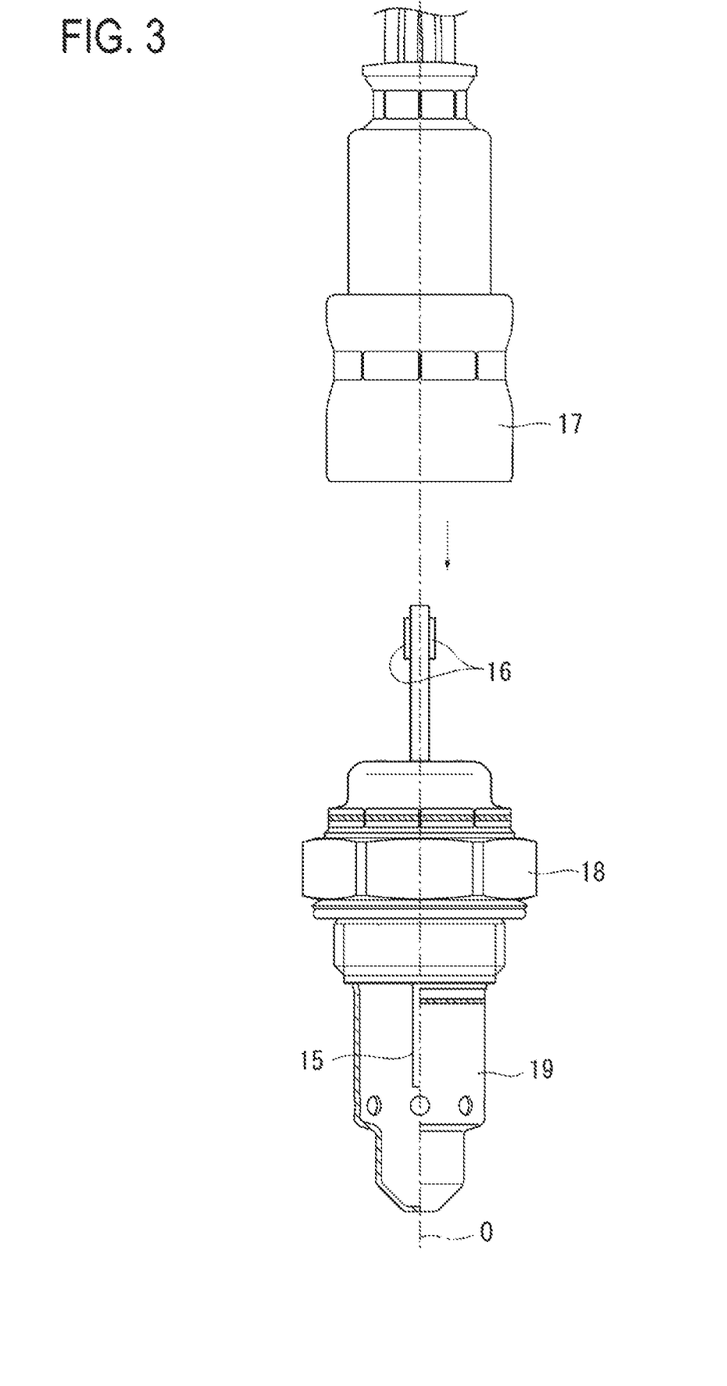
FIG. 3 is view showing a step of assembling a case assembly to an element assembly in which the terminal fitting is connected to the lead wires.

FIG. 1 is a half-sectional view taken along a direction of an axis O of an oxygen sensor (sensor) 100 according to an embodiment of the present invention. FIG. 2 is a view showing a step of crimp-connecting a terminal fitting 25 to lead wires 12. FIG. 3 is a view showing a step of assembling a case assembly to an element assembly in which the terminal fitting 25 is connected to the lead wires 12.

The oxygen sensor 100 is attached to an exhaust pipe (not shown) of an automobile and detects an oxygen concentration in exhaust gas. Since the exhaust pipe may be in a high temperature state of, for example, 800° C. due to heat of the exhaust gas, the oxygen sensor 100 also has a high temperature. In addition, external heat may also be applied to the oxygen sensor 100. Therefore, measures must be taken to protect the oxygen sensor 100 against such heat.

In particular, when the oxygen sensor 100 is disposed close to an engine of a vehicle or an exhaust system (an exhaust manifold and the like) of the vehicle, almost the entirety of the lead wires 12 (a protection tube 13) needs to be covered with a heat shield tube in order to further improve the heat resistance of the sensor.

As shown in FIG. 1, the oxygen sensor 100 includes a sensor element 15, a cylindrical metallic shell 18 that holds the sensor element 15, a cylindrical protector 19 that covers a distal end side of the sensor element 15, and a cylindrical case 17 that covers a rear end side of the sensor element 15. A rubber sealing member 11 is crimped at a rear end side of the case 17 to seal inside and outside, and the lead wires 12 are inserted through the seal member 11 and drawn outside.

The sensor element 15 is a plate-shaped laminated member extending in the direction of the axis O, and includes an element portion including a detection portion and a heater portion for heating the element portion.

The metallic shell 18, the protector 19 and the case 17 are made of a heat-resistant metal material such as stainless steel, and the protector 19 and the case 17 are respectively connected to a distal end side and a rear end side of the metal shell 18 by welding or the like.

A plurality of lead wires 12 are provided, and a large diameter connector portion 20 protruding radially outward of the lead wires 12 is electrically connected to a rear end side of the lead wires 12. The connector portion 20 can be connected to an external device (such as an ECU of a vehicle).

The rear end side of the lead wires 12 is collectively covered with the protection tube 13, and the protection tube 13 extends so as to be adjacent to the connector portion 20.

The protection tube 13 is a cylindrical braided body made of glass fiber, and is flexible.

The oxygen sensor 100 includes a cylindrical heat shield tube 30 that covers an outer surface of a rear end side 17e of the case 17 and that extends rearward of the case 17 so as to surround a periphery of the lead wires 12 (or the protection tube 120).

The case 17 includes a step portion 17d having a diameter that decreases from a distal end to a rear end covering the rear end side of the metallic shell 18.

Inside the case 17, an insulating separator (not shown) made of an insulating material such as alumina is disposed on a distal end side of a position f the seal member 11. The insulating separator accommodates the terminal fitting 25 shown in FIG. 2.

In the present embodiment, the lead wires 12 include five lead wires. The lead wire 12 is a signal line that extracts a detection signal detected by the sensor element 15 and transmits a drive signal for driving the oxygen sensor 100. A distal end of the lead wire 12 is crimp-connected to a rear end side of the terminal fitting 25 (see FIG. 2), and the terminal fitting 25 is electrically connected to an electrode pad 16 (see FIG. 3) on the rear end side of the sensor element 15. The seal member 11 has five lead wire insertion holes, through which the five lead wires 12 are individually inserted one by one, extending in the direction of the axis O.

The heat shield tube 30 is a cylindrical member extending in the direction of the axis O. An outer surface and an inner surface of the heat shield tube 30 are made of a material having a thermal conductivity that is higher than that of the seal member 11. Specifically, the heat shield tube 30 is formed by coating an outer surface of a glass fiber braided body with, for example, a metal foil such as aluminum or a vapor deposition body, and has high rigidity and low stretchability in the direction of the axis O.

Since the outer surface of the heat shield tube 30 is covered with metal, even when an environment around the oxygen sensor 100 is in a high temperature environment, heat transfer to the internal seal member 11 and the lead wires 12 can be prevented by reflecting external heat rays.

As shown in FIG. 1, the heat shield tube 30 includes a first tube 31 and a second tube 32 that has an inner diameter larger than an outer diameter of the first tube 31 and is capable of accommodating the first tube 31. The second tube 32 is disposed on a distal end side of the first tube 31 and covers the outer surface of the rear end side 17e of the case 17 while providing an overlapping portion 33 that overlaps the first tube 31. On the other hand, a rear end side of the first tube 31 is adjacent to the connector portion 20. Here, "adjacent" means that the rear end side of the first tube 31 may be in contact with the connector portion 20 or may be close to the connector portion 20 without being in contact therewith.

Here, in the present embodiment, a C-shaped C-ring 50 for fixing the second tube 32 to the case 17 is externally fitted to a position corresponding to the rear end side 17e of the case 17 on a distal end side of the second tube 32. Similarly, a C-ring 50 for fixing the second tube 32 and the first tube 31 is externally fitted to a position corresponding to the overlapping portion 33 on a rear end side of the second tube 32.

The C-ring 50 is fixed by reducing the diameter with a predetermined jig after being placed on the second tube 32 in the fixed position.

Here, a total length T of the heat shield tube 30 and a length S of the overlapping portion 33 satisfy the relationship $T/10 \leq S \leq T/5$, and when a length L1 of the first tube 31 and a length L2 of the second tube 32 are set, the relationship $T/2 \leq L2 < L1$ is satisfied. A total length T of the heat shield tube 30 is a length in the direction of the axis O from a distal end of the second tube 32 to a rear end of the first tube 31 when fixed with the overlapping portion 33.

An upper limit of L1 is $L1 \leq (T/2+S)$ based on a relationship of $T/2 \leq L2$ and $T=L1+L2-S$ described above.

First, the reason for setting $L2<L1$ is because a font end of the first tube 31 can be grasped when the first tube 31 is extended to the distal end of the second tube 32. This is because the first tube 31 protrudes from the distal end of the second tube 32 when the first tube 31 is accommodated inside the second tube 32 as shown in FIG. 2.

The reason for setting $T/2 \leq L2$ is because if $T/2>L2$, L2 is too short compared to the total length T, the degree of shortening of the entire heat shield tube 30 in the direction of the axis line O from the total length T when the first tube 31 is accommodated inside the second tube 32 is reduced, and a space V2 described below is difficult to secure.

The reason for setting $T/10 \leq S \leq T/5$ is to appropriately ensure a length S of the overlapping portion 33. If $T/10<S$, the overlapping portion 33 is too short. If $S>T/5$, the overlapping portion 33 is too long, the degree of shortening of the entire heat shield tube 30 in the direction of the axis line O from the total length T when the first tube 31 is accommodated inside the second tube 32 is reduced, and the space V2 described below is difficult to secure.

Next, the effects of defining the lengths of the first tube 31 and the second tube 32 as described above will be described with reference to FIG. 2.

First, in the present invention, since the first tube 31 and the second tube 32 constituting the heat shield tube 30 are provided with the overlapping portion 33 and extend from the rear end side 17e of the case 17 to a portion adjacent to the connector portion 20, almost the entirety of the lead wires 12 (the protection tube 13) can be covered with the heat shield tube 30, and the heat resistance can be improved.

On the other hand, since the heat shield tube 30 has low elasticity, when the heat shield tube 30 is extended from the rear end side 17e of the case 17 to the portion adjacent to the connector portion 20, subsequent crimp-connecting of the terminal fitting 25 to a distal end side of the lead wires 12 is hindered and made difficult.

That is, as described above, since the connector portion 20 is connected to the rear end side of the lead wires 12 in advance, in order to subsequently crimp-connect the connection terminal 25 to the distal end side of the lead wire 12, the space V2 for gripping the lead wires 12 needs to be secured between the distal ends of the lead wires 12 and the case 17 by advancing the lead wires 12 to the distal end side through the case 17.

Here, since the connector portion 20 protrudes radially outward of the lead wires 12 and has a diameter that is larger than the inner diameter of the heat shield tube 30, the connector portion 20 abuts and interferes with a rear end of the heat shield tube 30. Therefore, when the heat shield tube 30 is extended from the rear end side 17e of the case 17 to the portion adjacent to the connector portion 20, it is difficult to advance the lead wires 12 toward the case 17.

Therefore, since the first tube 31 constituting the heat shield tube 30 can be accommodated inside the second tube 32, a length of the heat shield tube 30 during accommodation is shortened to the length L1 of the first tube 31. This produces a difference between L1 and the total length T of the heat shield tube 30 during extension. The lead wires 12 together with the heat shield tube 30 can be advanced distally through a case 17x that is not crimped by this difference, so that the space V2 can be secured.

Since the case 17x is not crimped, the seal member 11 is not crimped, and the lead wires 12 can be advanced through the seal member 11.

The difference between L1 and the total length T in which the first tube 31 can be accommodated inside the second tubes (T−L1). However, a portion of the second tube 32 that covers the rear end side 17e of the case 17 cannot be used for advancing the lead wires 12, so that a net difference is a length V3 in FIG. 2.

As described above, the lead wires 12 extending to outside of the sensor 100 can be reliably surrounded by the heat shield tube 30 to improve the heat resistance. Further, such configuration can prevent connection of the terminal fitting 25 to the lead wires 12 from being hindered, so that productivity is not impaired.

As shown in FIG. 3, the lead wires 12 connected to the terminal fitting 25 are drawn out to the rear end side, the terminal fitting 25 is held in the separator (not shown) in the case 17, and the case assembly is manufactured by crimping the case 17 outside the seal member 11 through which the lead wires 12 are inserted.

The case assembly is disposed on a rear end side of the element assembly in which the sensor element 15 is attached to the metallic shell 18 and the protector 19. The case 17 covers the rear end side of the metallic shell 18 such that the terminal fitting 25 is electrically connected to the electrode pad 16 of the sensor element 15. The sensor 100 is manufactured by welding all around the case 17.

In the present invention, the heat shield tube 30 is not limited to one including the first tube 31 and the second tube 32, but can be expanded to include three tubes from a first tube to a third tube.

In this case, the heat shield tube may include the first tube, a second tube that has an inner diameter that is larger than an outer diameter of the first tube and is capable of accommodating the first tube, and the third tube that has an inner diameter that is larger than an outer diameter of the second tube and is capable of accommodating the second tube.

The tubes are disposed in an order from a distal end side to the third tube, the second tube and the first tube. The third tube is disposed on the distal end side of the second tube and covers an outer surface of a rear end side of the case while providing a first overlapping portion overlapping the second tube. The second tube is disposed on a distal end side of the first tube while providing a second overlapping portion overlapping with the first tube, and a rear end side of the first tube is adjacent to the connector portion.

Here, a total length T of the heat shield tube, a length S1 of the first overlapping portion and a length S2 of the second overlapping portion satisfy the relationships T/10≤S1≤T/5 and T/10≤S2≤T/5, and the length L1 of the first tube, the length L2 of the second tube and a length L3 of the third tube satisfy the relationship T/3≤L3<L2<L1.

An upper limit of L1+L2 is (L1+L2)≤2T/3+(S1+S2) based on a relationship of T/3≤L3 and T=L1+L2+L3−(S1+S2) described above.

The present invention is not limited to the above embodiment, but extends to various modifications and equivalents within the spirit and scope of the invention.

For example, the material of the heat shield tube 30 is not limited to the above embodiment, and may have heat shielding properties.

A method of fixing the second tube 32 to the case 17 and a method of fixing the second tube 32 and the first tube 31 at positions corresponding to the overlapping portion 33 are not limited to the C-ring, and examples thereof include a band and a wire.

The sensor element is not limited to a plate-shaped element, and may be a cylindrical element.

The type of sensor is not limited, and in addition to the oxygen sensor, examples thereof include a NOx sensor, a full-range sensor, a temperature sensor and a PM (particulate matter) sensor.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP2019-030512 filed Feb. 22, 2019, incorporated herein by reference in its entirety.

What is claimed is:

1. A sensor comprising:
   a sensor element;
   a metallic shell that accommodates the sensor element;
   a terminal fitting that is disposed on a r end side of the sensor element and electrically connected to the sensor element;
   a cylindrical case that extends in an axial direction and is disposed and connected on a rear end side of the metallic shell;
   one or more lead wires that are electrically connected to a rear end side of the terminal fitting and extend from inside to outside of the case;
   a connector portion that is connected to a rear end side of the lead wires and protrudes radially outward of the lead wires; and
   a cylindrical heat shield tube that covers an outer surface of a rear end side of the case, extends rearward of the case and surrounds the lead wires, wherein
   the heat shield tube includes a first tube and a second tube that has an inner diameter larger than an outer diameter of the first tube and is capable of accommodating the first tube,
   the second tube is disposed on a distal end side of the first tube and covers an outer surface of the rear end side of the case, while providing an overlapping portion that overlaps the first tube,
   a rear end side of the first tube is adjacent to the connector portion,
   a total length T of the heat shield tube and a length S of the overlapping portion satisfy T/10≤S≤T/5, and
   a length L1 of the first tube and a length L2 of the second tube satisfy T/2≤L2<L1.

2. The sensor as claimed in claim 1, wherein
the first tube and the second tube are formed by coating an outer surface of a glass fiber braided body with aluminum.

3. A sensor comprising:
a sensor element;
a metallic shell that accommodates the sensor element;
a terminal fitting that is disposed on a rear end side of the sensor element and electrically connected to the sensor element;
a cylindrical case that extends in an axial direction and is disposed and connected on a rear end side of the metallic shell;
one or more lead wires that are electrically connected to a rear end side of the terminal fitting and extend from inside to outside of the case;
a connector portion that is connected to a rear end side of the lead wires and that protrudes radially outward of the lead wires; and
a cylindrical heat shield tube that covers an outer surface of a rear end side of the case, extends rearward of the case and surrounds the lead wires, wherein
the heat shield tube includes a first tube, a second tube that has an inner diameter larger than an outer diameter of the first tube and is capable of accommodating the first tube, and a third tube that has an inner diameter larger than an outer diameter of the second tube and is capable of accommodating the second tube,
the third tube is disposed on a distal end side of the second tube and covers an outer surface of the rear end side of the case, while providing a first overlapping portion that overlaps the second tube,
the second tube is disposed on a distal end side of the first tube while providing a second overlapping portion that overlaps the first tube,
a rear end side of the first tube is adjacent to the connector portion,
a total length T of the heat shield tube, a length S1 of the first overlapping portion and a length S2 of the second overlapping portion satisfy $T/10 \leq S1 \leq T/5$ and $T/10 \leq S2 \leq T/5$, and
a length L1 of the first tube, a length L2 of the second tube and a length L3 of the third tube satisfy $T/3 \leq L3 < L2 < L1$.

4. The sensor as claimed in claim 3, wherein
the first tube to the third tube are formed by coveting an outer surface of a glass fiber braided body with aluminum.

* * * * *